United States Patent
Su et al.

(10) Patent No.: US 9,677,584 B2
(45) Date of Patent: Jun. 13, 2017

(54) FIXING SCREW STRUCTURE FOR ADJUSTING A FIXING PROCEDURE

(71) Applicant: NEXTRONICS ENGINEERING CORP., New Taipei (TW)

(72) Inventors: Hou-An Su, Keelung (TW); Yu-Liang Shao, Keelung (TW)

(73) Assignee: NEXTRONICS ENGINEERING CORP., New Taipei (TW)

( * ) Notice: Subject to any disclaimer, the term of this patent is extended or adjusted under 35 U.S.C. 154(b) by 91 days.

(21) Appl. No.: 14/918,632

(22) Filed: Oct. 21, 2015

(65) Prior Publication Data

US 2017/0023037 A1  Jan. 26, 2017

(30) Foreign Application Priority Data

Jul. 22, 2015 (TW) .............................. 104211827 U

(51) Int. Cl.
  *F16B 19/00* (2006.01)
  *F16B 5/02* (2006.01)
(52) U.S. Cl.
  CPC .................................. *F16B 5/0241* (2013.01)
(58) Field of Classification Search
  CPC ...... F16B 5/0216; F16B 5/0233; F16B 39/24; F16B 39/28
  USPC ... 411/353, 109, 111, 112, 136, 148, 35, 44, 411/60.2; 403/408.1, 297
  See application file for complete search history.

(56) References Cited

U.S. PATENT DOCUMENTS

| | | | | |
|---|---|---|---|---|
| 726,378 | A * | 4/1903 | Tucker | F16C 25/02 334/71 |
| 4,470,735 | A * | 9/1984 | Salisbury | F16B 39/28 411/272 |
| 5,106,225 | A * | 4/1992 | Andre | F16B 5/0233 403/297 |
| 5,261,650 | A * | 11/1993 | Hein | B60G 15/068 267/153 |
| 5,876,024 | A * | 3/1999 | Hain | B64C 1/18 244/119 |
| 6,287,064 | B1 * | 9/2001 | Jhumra | F16B 37/043 411/112 |
| 6,318,037 | B1 * | 11/2001 | Hansen | E06B 1/30 52/204.54 |
| 6,702,503 | B2 * | 3/2004 | Pinzl | F16B 37/042 403/187 |

(Continued)

*Primary Examiner* — Gary Estremsky
(74) *Attorney, Agent, or Firm* — Li & Cai Intellectual Property (USA) Office

(57) ABSTRACT

A fixing screw structure for adjusting a fixing procedure used for fixing a panel to a casing, including a screw, an elastomer and a fixing frame. The screw includes a threaded portion and a tapered portion, and passes through the panel, and the threaded portion is screwed on the casing. The elastomer is annular and disposed around the screw, and has a taper hole corresponding to the tapered portion. The fixing frame is a hollow tube, and is fixed on the panel and positioned around the elastomer. When the screw is screwed, the tapered portion abuts the inner wall of the taper hole and the elastomer is expanded outwardly to fitly abut the inner wall of the fixing frame. The instant disclosure transforms the longitudinal screwing force into a transverse expanding force to fix the panel, thereby eliminating the cumulative tolerance of the casing and the panel.

11 Claims, 7 Drawing Sheets

(56) References Cited

U.S. PATENT DOCUMENTS

| | | | |
|---|---|---|---|
| 6,712,544 B2 * | 3/2004 | Kruger | F16B 5/0233 |
| | | | 403/370 |
| 8,496,394 B2 * | 7/2013 | Schneider | F16B 3/06 |
| | | | 403/337 |
| 8,893,369 B2 * | 11/2014 | Wang | H05K 3/3447 |
| | | | 29/453 |

* cited by examiner

FIXING SCREW STRUCTURE FOR ADJUSTING A FIXING PROCEDURE

BACKGROUND

1. Technical Field

The present disclosure relates to a fixing screw structure for adjusting a fixing procedure, in particular, to a fixing screw structure for fixing a panel to a casing.

2. Description of Related Art

In the existing art, the hand-screwed screw 100 is used to fix the panel 200 on the casing 300 (as shown in FIGS. 1 and 1A), the panel 200 has a locking plate 400 (interface card) installed thereon, and the locking plate 400 may be plugged to the back plate 500 positioned inside of the casing 300 via connectors 600 and 700, thereby achieving an electrical connection.

However, when the casing 300 has an accumulated tolerance and the locking plate 400 has been plugged to the bottom of the connector 700 of the back plate 500, there is still a gap between the panel 200 and the casing 300. Meanwhile, if a fixing force is continued to be applied, the locking plate 400 will be bent, the hand-screwed screw 100 will break, or the screw on the back plate will break since the locking plate 400 is unable to move.

Accordingly, in order to overcome the above disadvantages, the inventor has developed and provided an invention that has a reasonable design and may overcome the above disadvantages.

SUMMARY

The problem to be solved of the instant disclosure is the need of a fixing screw structure for adjusting a fixing procedure, in order to protect the locking plate and the screw, to prevent the locking plate from bending, the fixing screw from breaking or the screw of the back plate from breaking.

In order to solve the technical problem above, the instant disclosure provides a fixing screw for adjusting a fixing procedure, for fixing a panel to a casing, the panel has a via hole, the casing has a threaded hole, and the fixing screw structure comprises: a screw comprising a threaded portion and a tapered portion, the tapered portion is a cone and has an outer diameter gradually decreased toward the direction of the threaded portion, the screw passes through the via hole of the panel and the threaded portion of the screw screws into the threaded hole of the casing; an elastomer disposed around the screw, the elastomer has a first end and a second end, the first end is near to the casing, the elastomer has a taper hole, the taper hole has an inner diameter gradually decreased toward the direction of the first end; a fixing frame which is a hollow tube, one end of the fixing frame is fixed on the panel, the fixing frame is disposed around the elastomer; and when the screw is screwed toward the direction of the casing, the tapered portion of the screw abuts the inner wall of the threaded hole of the elastomer and the elastomer is expanded to fitly abut the inner wall of the fixing frame and thereby fixing the panel to the casing.

The instant disclosure further provides a fixing screw for adjusting a fixing procedure, for fixing a panel to a casing, the panel has a via hole, the casing has a threaded hole, and the fixing screw structure comprises: a screw comprising a threaded portion and a tapered portion, the tapered portion is a cone, the screw passes through the via hole of the panel, the threaded portion of the screw is screwed into the threaded hole of the casing; an elastomer disposed around the screw, the elastomer has a taper hole; a fixing frame which is a hollow tube, the fixing frame is fixed on the panel, the fixing frame is positioned around the elastomer; and when the screw is screwed toward the direction of the casing, the tapered portion of the screw abuts the inner wall of the threaded hole of the elastomer and the elastomer is expanded to fitly abut the inner wall of the fixing frame and thereby fixing the panel to the casing.

Preferably, the tapered portion has a taper of 8 to 16 degrees.

Preferably, the tapered portion has a taper of 12 degrees.

Preferably, the distance between the panel and the casing is 0 to 1.6 mm.

The instant disclosure comprises at least the following advantages:

By utilizing the fixing screw for adjusting a fixing procedure of the instant disclosure, when the screw is screwed, the tapered portion of the screw will abut the inner wall of the threaded hole, thereby outwardly expanding the elastomer to fitly abut the inner wall of the fixing frame and thereby fixing the panel to the casing.

In order to further understand the techniques, means and effects of the instant disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
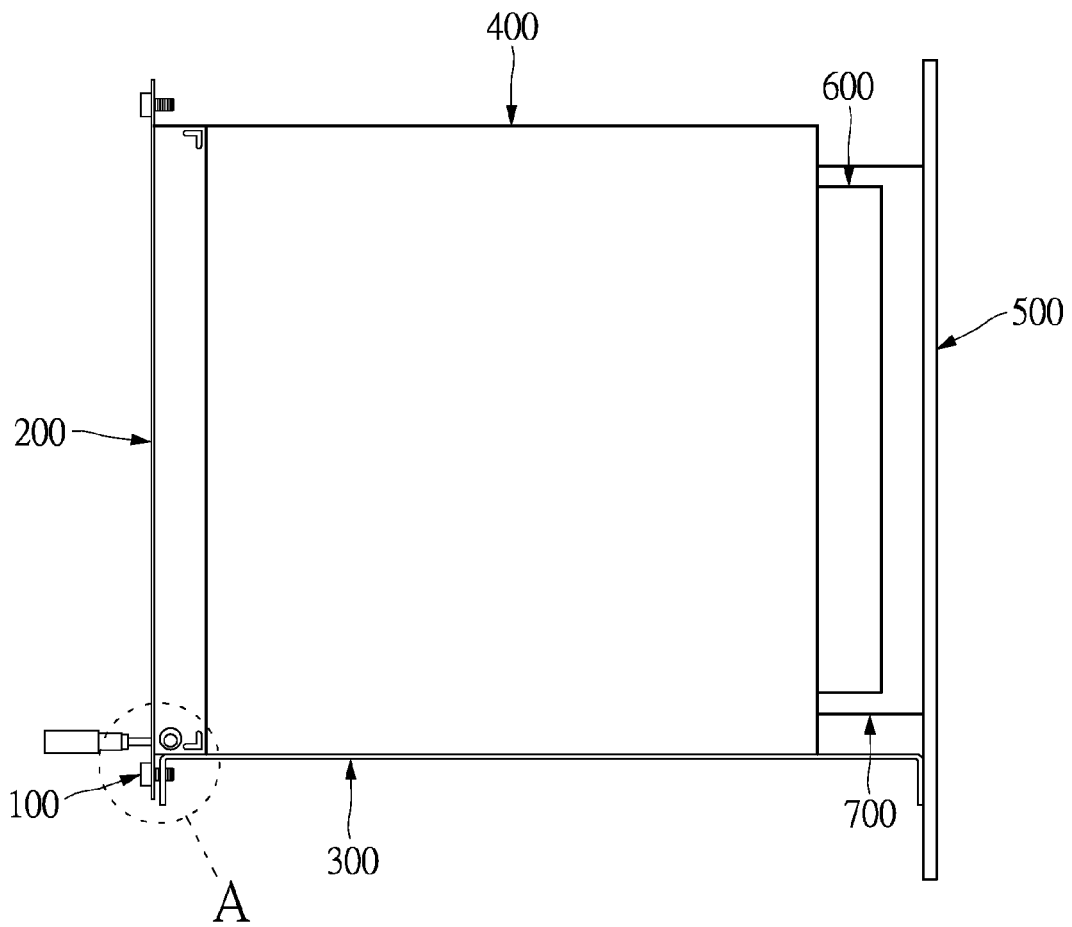
FIG. 1 is a schematic drawing of the fixing screw of the prior art when in use.
Figure 1A:
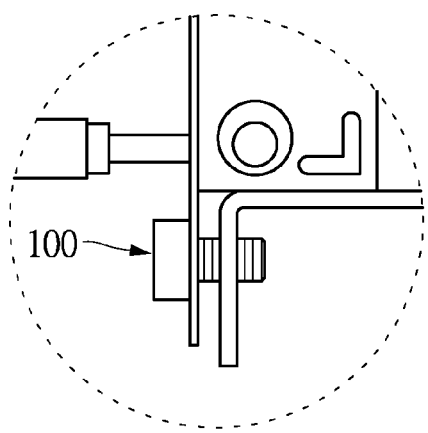
FIG. 1A is a partial enlargement of part A of FIG. 1.
Figure 2:
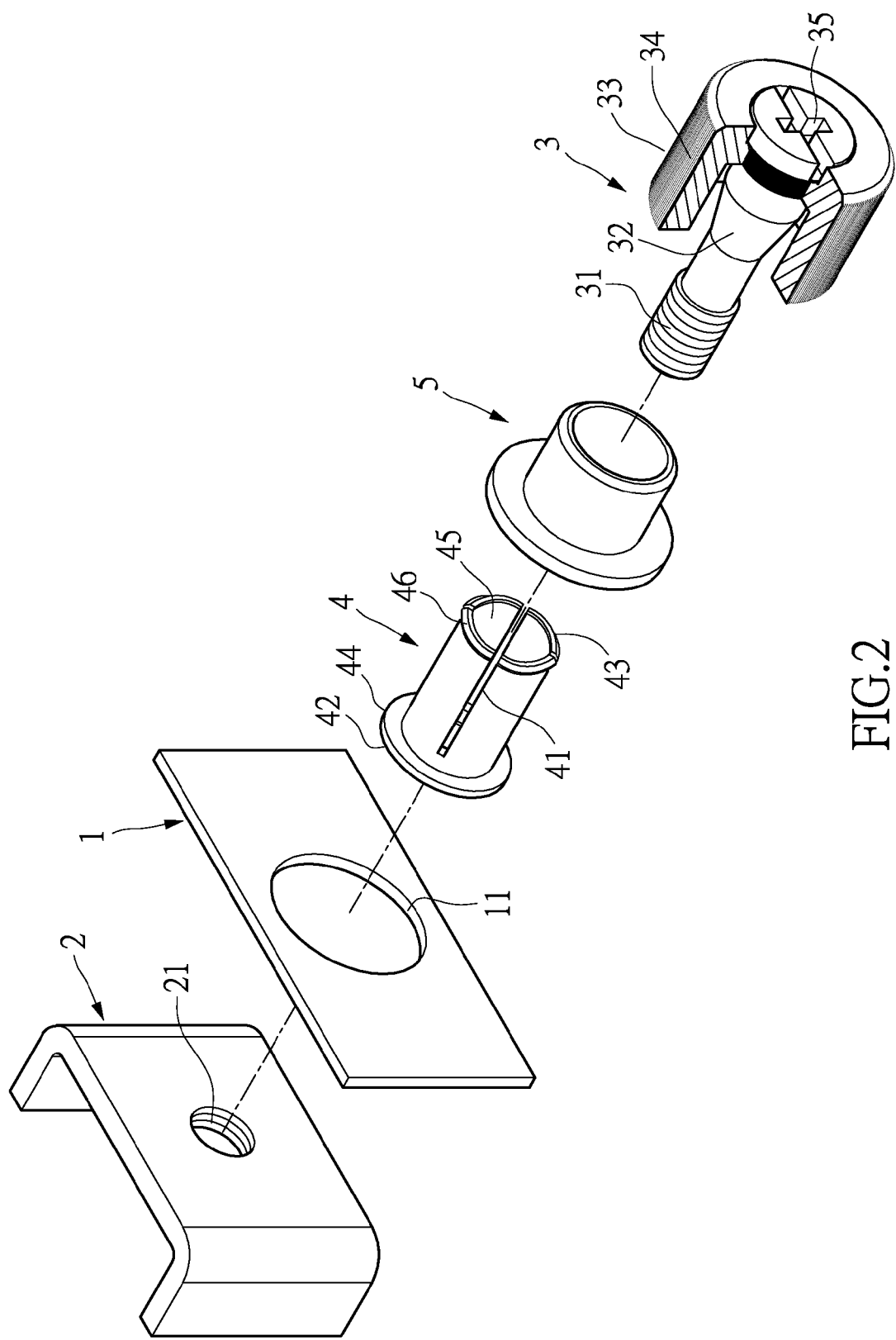
FIG. 2 is an exploded view of the fixing screw structure for adjusting a fixing procedure of the instant disclosure.
Figure 3:
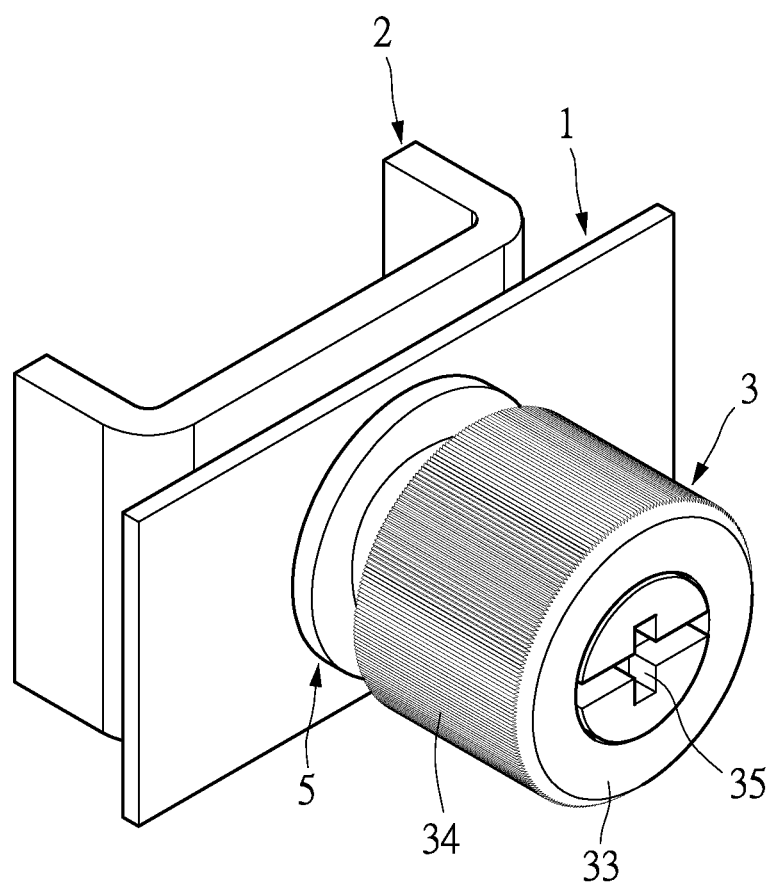
FIG. 3 is an exploded assembled view the fixing screw structure for adjusting a fixing procedure of the instant disclosure.
Figure 4:
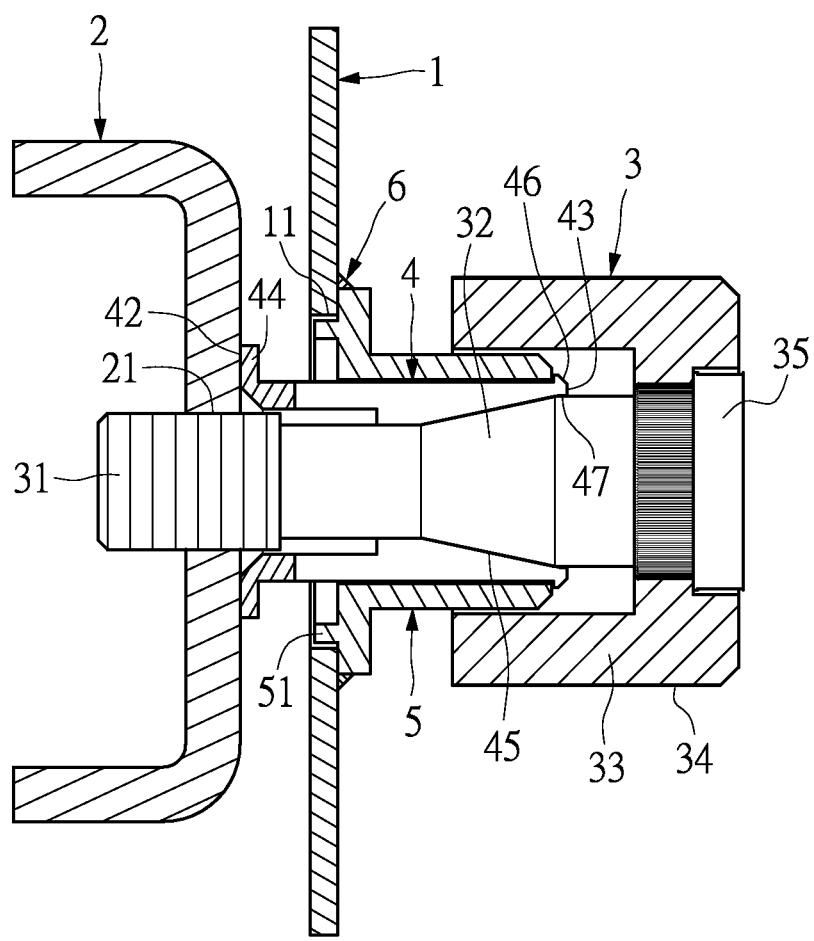
FIG. 4 is a sectional view of the fixing screw structure for adjusting a fixing procedure of the instant disclosure.
Figure 5:
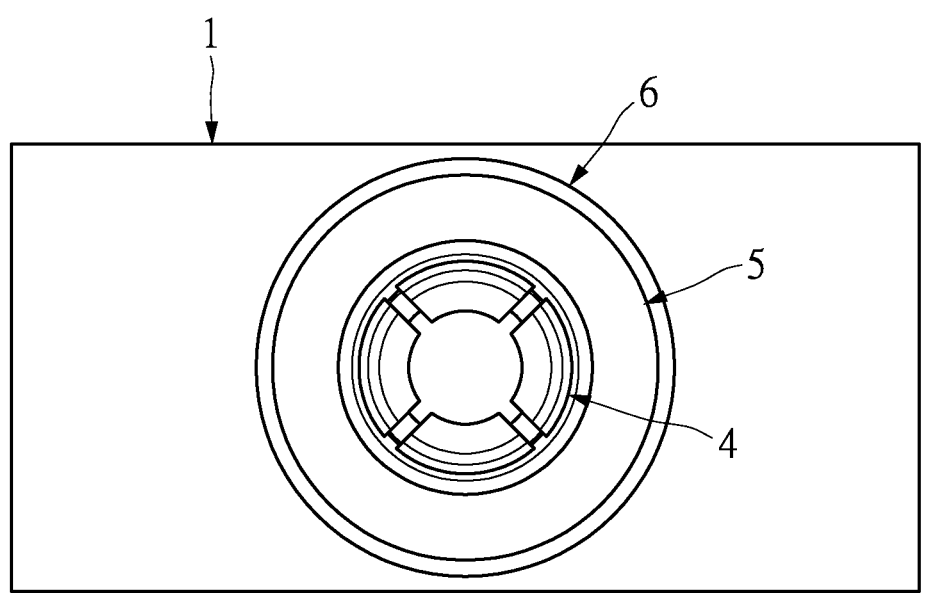
FIG. 5 is a front view of the fixing screw structure for adjusting a fixing procedure of the instant disclosure (the screw is omitted).

Reference will now be made in detail to the exemplary embodiments of the present disclosure, examples of which are illustrated in the accompanying drawings. Wherever possible, the same reference numbers are used in the drawings and the description to refer to the same or like parts.

First Embodiment

Please refer to FIG. 2 to FIG. 5. The instant disclosure provides a fixing screw of a fixing screw structure for adjusting locking procedure used for fixing a panel 1 to a casing 2. The panel 1 may be a metal plate such as a stainless steel plate, an aluminum plate or a steel plate, however the material of the panel 1 is not limited. The panel 1 is positioned outside of the casing 2 and has a via hole 11. The vial hole 11 may be a circular hole. The casing 2 has a threaded hole 21. The threaded hole 21 of the casing 2 is positioned corresponding to the via hole 11 of the panel 1. The panel 1 generally comprises a locking plate (interface card) installed thereon, and the locking plate may be plugged in a back plate positioned inside of the casing 2 via connectors, thereby achieving an electrical connection.

The fixing screw structure comprises a screw 3, an elastomer 4 and a fixing frame 5. The screw 3 has a threaded portion 31 and a tapered portion 32, and the threaded portion 31 is formed on one end of the screw 3 and extended for a predetermined length. However, the specification and dimensions of the threaded portion 31 are not limited and may be changed dependent on the requirements. The tapered portion 32 is positioned between the two ends of the screw 3 and is a cone. The tapered portion 32 may have an outer diameter gradually decreased toward the direction of the threaded portion 31. The tapered portion 32 may have a taper of 8 to 16 degrees, preferably 12 degrees.

The other end of the screw 3 may have a holding portion 33. The holding portion 33 may be assembled to the other end of the screw 3 by riveting, or be integrally formed on the other end of the screw 3. The holding portion 33 may have a larger outer diameter, and may have non-slip texture 34 positioned on the outer edge thereof for holding and rotating the screw 3 by hand. The other end of the screw 3 may have a groove 35 with a linear shape or a cross-shape for rotating the screw 3 by a screwdriver. However, the shape and structure of the holding portion 33 are not limited. The screw 3 may pass through the via hole 11 of the panel 1, and the threaded portion 31 of the screw 3 may be screwed to the threaded hole 21 of the casing 2, therefore, the screw may be screwed into the casing 2 or be disassembled from the casing 2.

The elastomer 4 may be a circular tube and may be positioned around the screw 3, and the length of the elastomer 4 is smaller than the length of the screw 3, therefore, the elastomer 4 is positioned around a portion of the screw 3, i.e., the elastomer is positioned around at least the tapered portion 32 of the screw 3. The elastomer 4 may have at least one trench 41, preferably, the elastomer has a plurality of trenches 41. The trenches 41 extend along the longitudinal direction of the elastomer 4 from one end of the elastomer 4 to the other end of the elastomer 4, therefore, the inner diameter and the outer diameter of the elastomer 4 may be varied.

The elastomer 4 has a first end 42 and a second end 43, the first end 42 and the second end 43 are on the two opposite ends of the elastomer 4 respectively, in which the first end 43 is near to the casing 2, and the second end 43 is far from the casing 2. A portion of the elastomer 4 near to the first end 42 may extend outwardly to form a first flange 44, the first flange 44 is protruded from an outer wall of the elastomer 4 and is substantially perpendicular to the longitudinal direction of the elastomer 4. The first flange 44 may be used to abut the casing 2, therefore, the elastomer 4 may be steadily in contact with the casing 2.

The elastomer 4 has a taper hole 45. The taper hole 45 corresponds to the tapered portion 32 of the screw 3, i.e., the taper hole 45 may have an inner diameter gradually decreased toward the first end 42. The taper hole 45 may be positioned in the elastomer 4 and near to the second end 43. A portion of the elastomer 4 near to the second end 43 may form a second flange 46, the second flange 46 is protruded from the outer wall of the elastomer 4, and may be used to abut one end of the fixing frame 5. The inner wall of the elastomer 4 may have an annular surface 47 near to the second end 43, and the annular surface 47 is between the taper hole 45 and the second end 43 and is parallel to the longitudinal direction of the elastomer 4.

The fixing frame 5 may be made from metal materials such as stainless steel, aluminum or steel. The fixing frame 5 is a circular hollow column. One end of the fixing frame 5 may further have an annular projection 51, therefore, one end of the fixing frame 5 may be stepped and the projection 51 is accommodated to the via hole 11 of the casing 1 and thereby locating the fixing frame 5 on the panel 1. One end of the fixing frame 5 may be fixed on the panel 1 by micro-spot welding, i.e., the fixing frame 5 may be fixed to the panel 1 by the welding point 6 through welding, thereby integrating the fixing frame 5 and the panel 1. If the fixing frame 5 and the panel 1 are fixed through micro-spot welding, the fixing frame 5 and the panel 1 must be made from the same material. The fixing frame 5 is positioned around the elastomer 4.

When the screw 3 is screwed toward the casing 2, the tapered portion 32 moves forward, and the screwing force is longitudinal. After the tapered portion 32 of the screw 3 contacts with the inner wall of the taper hole 45 of the elastomer 4, the tapered portion 32 of the screw 3 would continue to move and expand the inner wall of the taper hole 45 outwardly. The expanding force is transverse. After the elastomer 4 expands, it will contact the inner wall of the fixing frame 5, thereby fitly abutting the inner wall of the fixing frame 5 and producing a resisting force. The resisting force is the reacting force of the expanding force for the elastomer 4 and is a transverse force as well. When the resisting force produced by the elastomer 4 and the fixing frame 5 is larger than the screwing force of the screw 3, the screw 3 will move forward and the elastomer will abut the fixing frame, therefore, the fixing frame 5 will be fixed. Since the fixing frame 5 is fixed on the panel 1, the panel 1 will be fixed as well, thereby fixing the panel 1 to the casing 2.

Second Embodiment

Figure 6:
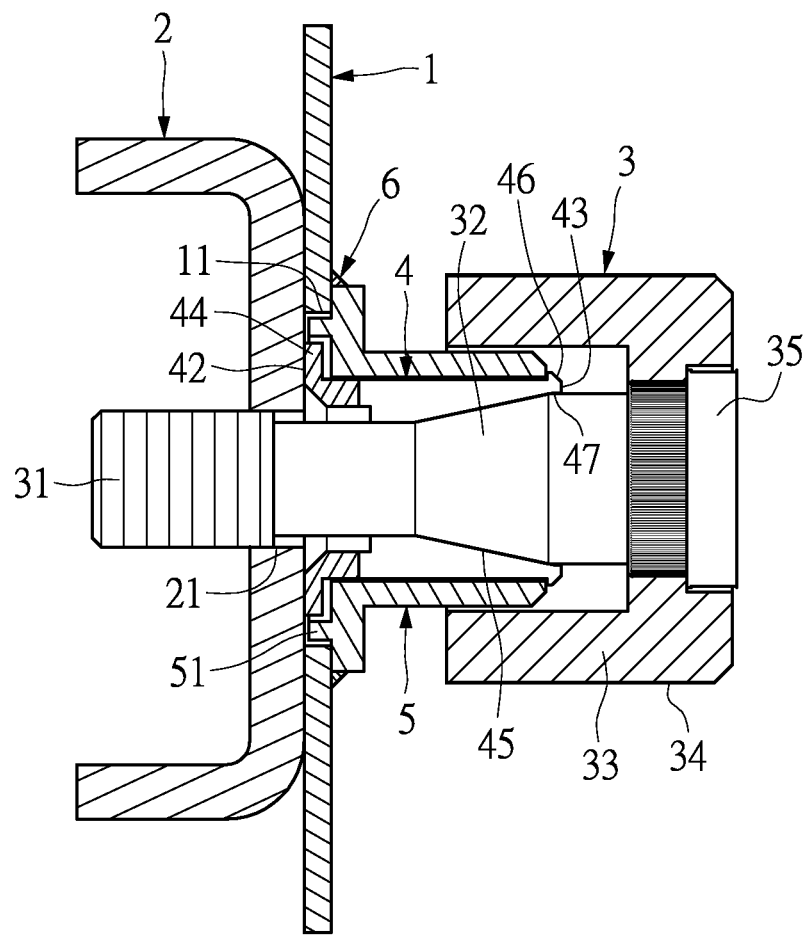
FIG. 6 is a sectional view of another embodiment of the fixing screw structure for adjusting a fixing procedure of the instant disclosure.

Please refer to FIG. 6. In the Second embodiment, there is no space or gap between the panel 1 and the casing 2, i.e., the panel 1 abuts the casing 2. The first flange 44 of the elastomer 4 may enter the via hole 11 of the panel 1, and is positioned on the inner side of the projection 51 of the fixing frame 5.

Third Embodiment

Figure 7:
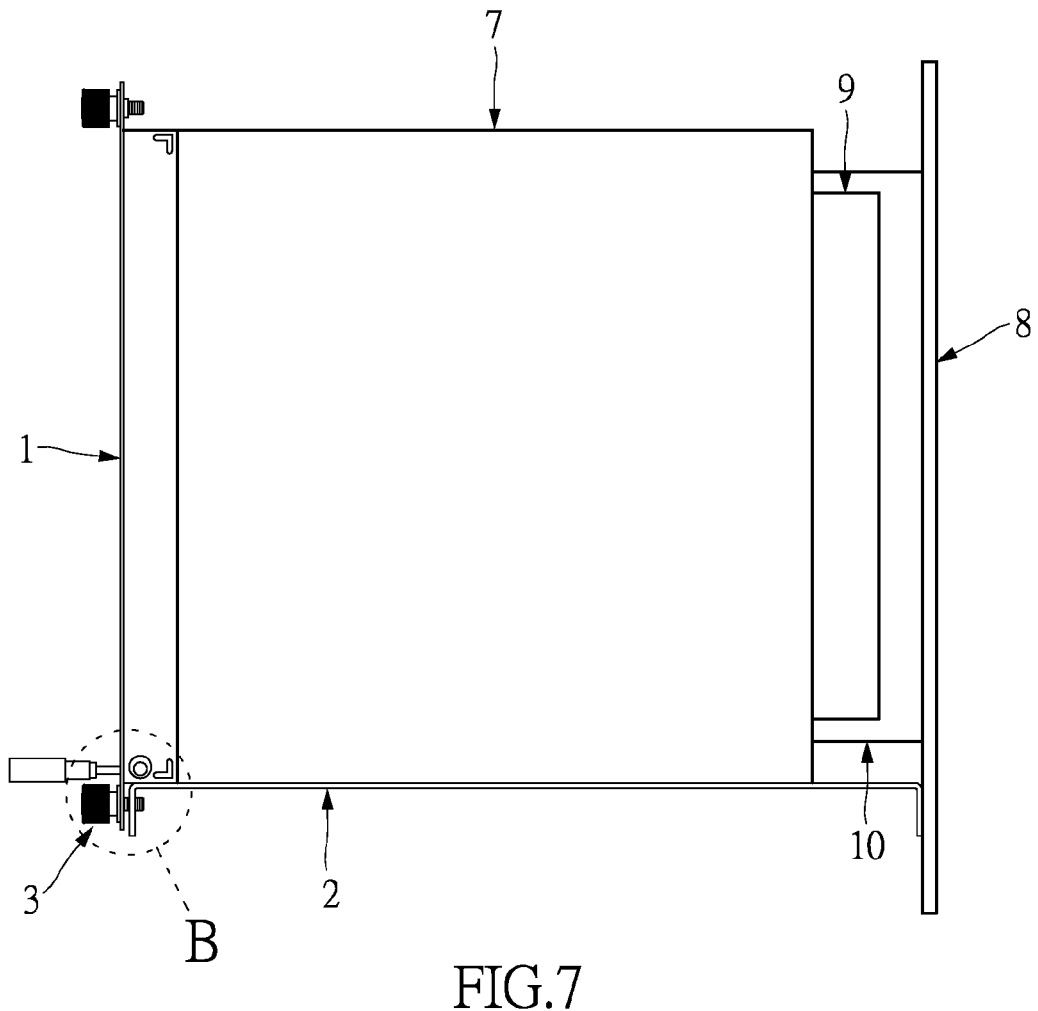
FIG. 7 is schematic drawing of the fixing screw of the fixing screw structure for adjusting a fixing procedure of the instant disclosure when in use.
Figure 7A:
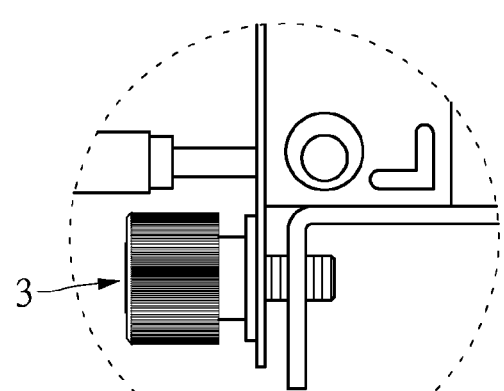
FIG. 7A is a partial enlargement of part B of FIG. 7.

Please refer to FIG. 7 and FIG. 7A, the fixing screw structure of the instant disclosure may fix the panel 1 to the casing 2. The panel 1 has a locking plate 7 (interface card) installed thereon. The locking plate 7 may be plugged in the back plate 8 positioned inside of the casing 2 via connectors 9 and 10, thereby achieving an electrical connection. In the case of the casing 2 having an accumulated tolerance, the locking plate 7 has been plugged to the bottom of the connector 10 of the back plate 8 and there is still a gap between the panel 1 and the casing 2. Therefore, the locking plate 7 is unable to move forward. Meanwhile, the elastomer 4 on the screw 3 will continue to move and transform the screwing force of the screw 3 into a transversely expanding force to fix the panel 1, and therefore eliminate the accumulated tolerance and protect the locking plate 7 and screw 3, thereby avoiding the locking plate 7 from bending, the fixing screw 3 from breaking, or the fixing screw of the locking plate 7 from breaking.

The fixing screw structure of the instant disclosure may adjust the procedure according to different requirements; therefore, the distance between the panel 1 and the casing 2 may be from 0 to 1.6 mm. Furthermore, the fixing screw structure has a tensile strength test result of about 150~190 kilogram (kg).

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A fixing screw structure for the adjustable fixing of a panel to a casing, the panel has a through hole, the casing has a threaded hole, and the fixing screw structure comprises:
    a screw comprising a threaded portion and a tapered portion, the tapered portion is a cone and has an outer diameter gradually decreased toward the direction of the threaded portion, the screw passes through the through hole of the panel, and the threaded portion of the screw screws into the threaded hole of the casing;
    an elastomer disposed around the screw, the elastomer has a first end and a second end, the first end is near to the casing, the elastomer has a taper hole, the taper hole has an inner diameter gradually decreased toward the direction of the first end;
    a fixing frame which is a hollow tube, one end of the fixing frame is fixed on the panel, the fixing frame is disposed around the elastomer; and
    when the screw is screwed toward the direction of the casing, the tapered portion of the screw abuts an inner wall of the taper hole of the elastomer and the elastomer is expanded outwardly to fitly abut the inner wall of the fixing frame and thereby fixing the panel to the casing.

2. The fixing screw structure according to claim 1, wherein the tapered portion has a taper of 8 to 16 degree.

3. The fixing screw structure according to claim 2, wherein the tapered portion has a taper of 12 degree.

4. The fixing screw structure according to claim 1, wherein the distance between the panel and the casing is 0 to 1.6 mm.

5. The fixing screw structure according to claim 1, wherein the elastomer is a circular ring and has at least one trench, the trench extends along the longitudinal direction of the elastomer to one end of the elastomer.

6. The fixing screw structure according to claim 1, wherein the elastomer extends outwardly from the first end thereof and forms a first flange, the first flange is protruded from the outer wall of the elastomer and abuts the casing.

7. The fixing screw structure according to claim 1, wherein the elastomer has a second flange formed near to the second end thereof, the second flange is protruded from the outer wall of the elastomer, and thereby blocks and locates the fixing frame.

8. The fixing screw structure according to claim 1, wherein the inner wall of the elastomer has an annular surface formed near to the second end, the annular surface is positioned between the taper hole and the second end, and is parallel to the longitudinal direction of the elastomer.

9. The fixing screw structure according to claim 1, wherein one end of the fixing frame has an annular projection, the annular projection is accommodated to the through hole of the panel.

10. The fixing screw structure according to claim 1, wherein one end of the fixing frame is fixed on the panel through micro-spot welding.

11. A fixing screw structure for the adjustable fixing of a panel to a casing, the panel has a through hole, the casing has a threaded hole, and the fixing screw structure comprises:
    a screw comprising a threaded portion and a tapered portion, the tapered portion is a cone, the screw passes through the through hole of the panel, the threaded portion of the screw is screwed into the threaded hole of the casing;
    an elastomer disposed around the screw, the elastomer has a taper hole;
    a fixing frame which is a hollow tube, the fixing frame is fixed on the panel, the fixing frame is positioned around the elastomer; and
    when the screw is screwed toward the direction of the casing, the tapered portion of the screw abuts an inner wall of the threaded hole of the elastomer and the elastomer is expanded outwardly to fitly abut the inner wall of the fixing frame and thereby fixing the panel to the casing.

* * * * *